UNITED STATES PATENT OFFICE.

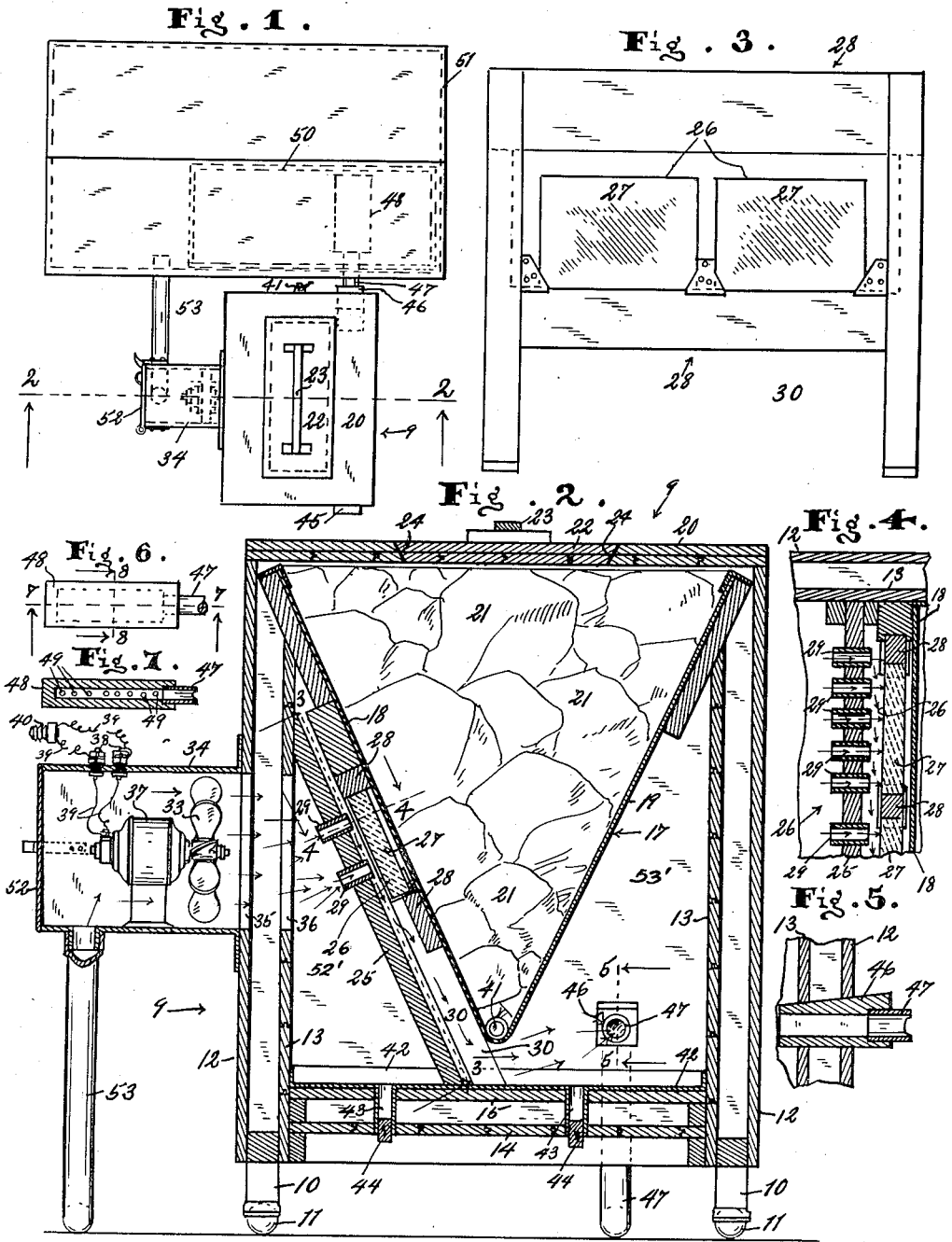
L. USHER.
APPARATUS FOR DEHUMIDIFYING, PURIFYING, AND COOLING AIR.
APPLICATION FILED JAN. 4, 1916.
1,202,250. Patented Oct. 24, 1916.

LUKE USHER, OF LOS ANGELES, CALIFORNIA.

APPARATUS FOR DEHUMIDIFYING, PURIFYING, AND COOLING AIR.

1,202,250.  Specification of Letters Patent.  Patented Oct. 24, 1916.

Application filed January 4, 1916. Serial No. 70,291.

*To all whom it may concern:*

Be it known that I, LUKE USHER, a citizen of the United States of America, residing at Los Angeles, county of Los Angeles, State of California, have invented a certain new and useful Apparatus for Dehumidifying, Purifying, and Cooling Air; and I do hereby declare the following to be a full, clear, and exact description of the invention, such as will enable others skilled in the art to which it appertains to make and use the same.

This invention relates to apparatus for dehumidifying, purifying and cooling air, and it may be said to consist in the provision of the novel and advantageous features and in the novel and improved construction, arrangement and combination of parts and devices as will appear from the description and claims which follow hereinafter.

One object of the invention is to provide a novel and improved apparatus whereby comparatively dry pure cool air can be supplied when desired for the benefit of sick persons, and which is also adapted for use generally in hot and humid climates.

Further objects of the invention are to provide a novel and improved apparatus of the character specified which is comparatively simple and inexpensive to manufacture, install, and operate, easy to keep clean, readily portable, convenient to use, neat in appearance, and effective in action.

Other objects and the advantages of the invention will be apparent to those skilled in the art from a careful consideration of the following description of the preferred form of the apparatus, taken in connection with the accompanying drawings in which Figure 1 is a partly broken top plan view of the apparatus; Fig. 2 is an enlarged sectional view taken on the line 2—2 of Fig. 1; Fig. 3 is an elevational view of the frame having the vitreous bricks thereon; Fig. 4 is a broken sectional view taken on the line 4—4 of Fig. 2; Fig. 5 is a broken sectional view taken on the line 5—5 of Fig. 2; Fig. 6 is a plan view of the air distributer; Fig. 7 is a sectional view of the air distributer taken on the line 7—7 of Fig. 6; and Fig. 8 is a cross sectional view of the air distributer taken on the line 8—8 of Fig. 6.

The portable cabinet 9 may have thereon legs 10 mounted on the rollers or casters 11, and it is preferably provided with outer side walls 12, inner side walls 13, an outer bottom wall 14, and an inner bottom wall 15; the inner and the outer walls being arranged to provide spaces therebetween for dead air to insulate the interior of the cabinet. Within the cabinet 9 is removably mounted a bin 17 which preferably has the front and rear walls 18 and 19 converging downwardly and joined at the lower end which is spaced from the floor or inner bottom wall 15 of the cabinet. A double top 20 is preferably provided on the cabinet and has therein an opening through which ice mixed with salt or other suitable refrigerant 21 may be placed in the bin 17. The cover 22, preferably provided with a handle 23 and with beveled edges 24, is adapted to fit in the opening in the top of the cabinet. Adjacent to the front wall 18 of the bin 17 is suitably arranged a preferably inclined partition 25. Adjacent to the latter is suitably mounted a condenser 26. The latter preferably consists of vitreous bricks 27 which are mounted on the frame 28. The partition 25 is provided with passageways 29 which are disposed at the front of the condenser 26 and they are preferably tubular and have their inner ends disposed opposite to the vitreous bricks 27 so that air driven through said passageways 29 impinges the vitreous bricks before it passes through the opening 30 at the lower part of the frame 28. Any suitable means may be employed to drive the air into the cabinet 9, that shown consisting of a fan or blower 33 which is arranged in a tubular housing 34 suitably mounted on the front side of the cabinet, and is adapted to impel air through the inlet openings 35 and 36 in the front walls 12 and 13. The electric motor 37 for operating the blower 33 may be electrically connected to binding posts 38 on the housing, and conductors 39 may have one end thereof connected to said binding posts and have the other end thereof attached to a plug 40 adapted to fit into an electric lamp socket to obtain electric current for the motor.

A drain cock 41 may be suitably connected with the lower portion of the bin 17, and a tray or pan 42 may be arranged on the floor of the cabinet and have connected therewith the drain pipes 43 which pass through the bottom of the cabinet 9 and are closed by removable stoppers 44. The lower rear portion of the cabinet 9 may be provided with one or more outlet openings which may be closed by removable plugs 45 and into which are adapted to fit the hollow tapering plug 46 into which is fitted one end of the flexible duct or air hose 47, which latter has its other end connected to a nozzle or distributer 48. The latter preferably consists of a rectangular hollow body provided with apertures 49 in opposite sides thereof to distribute the air. In Fig. 1 the distributer 48 is shown disposed under a cot or bed 50 which is indicated by dotted lines and arranged within a closed compartment or tent 51.

From the foregoing the manner of use and the advantages of the apparatus will readily be understood by those skilled in the art, and it will be seen that it is well adapted to accomplish the objects of the invention. When the air is driven by the blower 33 into the chamber 52′ in the front portion of the cabinet 9, the heavier particles of dirt and impurities carried by the air fall to the bottom of the cabinet before the air passes through the tubular passageways 29. After passing through the latter the stream of air impinges the front faces of the vitreous bricks 27 which latter having been cooled by the refrigerant 21 cause a condensation thereon of the moisture in the air. The condensed moisture catches the lighter impurities and microbes carried by said air. The vitreous bricks 27 are preferably spaced from the refrigerant bin 17 so that they are cooled sufficiently to condense but not congeal the moisture in air impinging them. After impinging the condenser the air passes downwardly in the space between the bin 17 and the partition 25 and thence through the opening 30 and into the chamber 53′ in the rear portion of the cabinet, and it is thoroughly cooled by contact with the front and rear walls 18 and 19 of the refrigerant bin 17. The dry pure cool air in the rear chamber 53 may be released into a closed room or compartment by removing the plugs 45 from the outlet openings, or it may be conducted to a closed room or compartment by means of any suitable duct or by means of the flexible duct 47 and distributer 48. If desired, the housing 34 may be provided with a door 52 and a flexible hose or air duct 53 may be connected between the closed compartment 51 and the housing 34 so that already cooled air may be treated again and again and the same air kept in circulation. The moisture, impurities and microbes which are deposited on the condenser fall into the drip pan 42 which latter may have therein a pinch of nitrate of silver or suitable disinfecting substance.

The construction which has been particularly illustrated and described admits of minor changes and modifications—wherefore the right is reserved to all such changes and modifications as do not depart from the spirit and scope of the invention which is defined in the appended claims.

I claim:

1. Apparatus of the nature specified, including a cabinet, a refrigerant bin mounted within the cabinet and having its front and rear walls converging downwardly and joined at the lower end which is spaced from the floor of the cabinet, vitreous bricks arranged adjacent to said bin so that they are cooled by the refrigerant, an inclined partition arranged adjacent to but spaced from the front wall of the bin, said partition being provided with tubular passageways which latter are arranged to have their inner ends disposed opposite to the front faces of the vitreous bricks, means for driving air into the cabinet, a drip pan on the floor of the cabinet, a flexible duct connected in communication with the rear portion of the interior of the cabinet, a closed compartment, and a distributer connected to the flexible duct and disposed in the compartment.

2. Apparatus of the nature specified, including a cabinet, a refrigerant bin mounted within the cabinet and having its front and rear walls converging downwardly and joined at the lower end which is spaced from the floor of the cabinet, vitreous bricks arranged adjacent to said bin so that they are cooled by the refrigerant, an inclined partition arranged adjacent to but spaced from the front wall of the bin, said partition being provided with tubular passageways which latter have their inner ends disposed opposite to the front faces of the vitreous bricks, means for driving air into the cabinet, and a drip pan on the floor of the cabinet.

3. Apparatus of the class specified, including a cabinet provided with an inlet opening in the front portion thereof and with an outlet opening in the rear portion thereof, a refrigerant bin mounted within the cabinet and having its front and rear walls converging downwardly and joined at the lower end which is spaced from the floor of the cabinet, vitreous bricks arranged adjacent to said bin so that they are cooled by the refrigerant, an inclined partition arranged adjacent to but spaced from the front wall of the bin, said partition being spaced a short distance from the front face of the vitreous bricks and having passageways disposed opposite to the front face of the vitreous bricks, means for driving air into the inlet opening, a duct having one end thereof fitted in the outlet opening, and a distributer connected to the other end of said duct.

4. Apparatus of the class specified, including a cabinet provided with an inlet opening in the front portion thereof and with an outlet opening in the rear portion thereof, a refrigerant bin mounted within the cabinet and having its lower end spaced from the floor of the cabinet, vitreous bricks arranged adjacent to said bin so that they are cooled by the refrigerant, a partition provided with passageways disposed opposite to the vitreous bricks, and means for driving air into the inlet opening.

In testimony whereof, I have signed my name to this specification at Los Angeles, county of Los Angeles, State of California, this 24th day of December A. D. 1915.

LUKE USHER.